United States Patent

Jinnouchi et al.

[11] Patent Number: 4,971,306
[45] Date of Patent: Nov. 20, 1990

[54] SEALS FOR CYLINDRICAL SURFACES

[75] Inventors: Takeshi Jinnouchi; Hirochi Matsumoto; Tetsuya Iguchi, all of Sakado, Japan

[73] Assignee: Eagle Industry Co., Ltd., Tokyo, Japan

[21] Appl. No.: 270,881

[22] Filed: Nov. 14, 1988

[30] Foreign Application Priority Data

Dec. 25, 1987 [JP] Japan ................. 62-327499
Feb. 15, 1988 [JP] Japan ................. 63-30817

[51] Int. Cl.$^5$ ............................... F16J 15/16
[52] U.S. Cl. ......................... 277/3; 277/27; 277/68; 277/71; 277/134; 277/142; 277/193
[58] Field of Search ............. 277/27, 45, 22, 68, 277/133, 134, 81.5, 193, 196, 3, 142, 7

[56] References Cited

U.S. PATENT DOCUMENTS

| | | | |
|---|---|---|---|
| 2,606,779 | 8/1952 | Jagger | 277/134 |
| 2,956,824 | 10/1960 | Kuchler et al. | 277/68 |
| 3,131,942 | 5/1964 | Ertand | 277/134 X |
| 3,241,842 | 3/1966 | Schweiger et al. | 277/68 X |
| 3,482,845 | 12/1969 | Bertrandi et al. | 277/134 |
| 3,554,561 | 1/1971 | Weinland | 277/134 |
| 3,575,424 | 4/1971 | Taschenberg | 277/27 |
| 3,633,927 | 1/1972 | Van Deven | 277/134 |
| 3,973,781 | 8/1976 | Grorich | 277/134 |
| 4,082,296 | 4/1978 | Stein | 277/133 X |
| 4,305,592 | 12/1981 | Peterson | 277/22 |
| 4,407,513 | 10/1983 | Takenaka et al. | 277/133 X |
| 4,444,399 | 4/1984 | Yanai et al. | 277/96.1 |
| 4,709,930 | 12/1987 | Forch | 277/134 X |

FOREIGN PATENT DOCUMENTS

| | | | |
|---|---|---|---|
| 621526 | 4/1949 | United Kingdom | 277/134 |
| 1239873 | 7/1971 | United Kingdom | 277/134 |

*Primary Examiner*—Allan N. Shoap
*Attorney, Agent, or Firm*—Jordan and Hamburg

[57] ABSTRACT

A shaft seal for sealing fluids includes a rotating shaft means having an axis and an external cylindrical surface. A seal ring is disposed about the shaft and has an internal cylindrical surface juxtaposed to the external cylindrical surface and mating therewith to form mating cylindrical surfaces. One of the cylindrical surfaces is a smooth cylindrical surface, and a plurality of spaced, generally parallel indentations are formed in the smooth cylindrical surface, the indentations extending at an acute angle relative to the axial direction of the shaft such that fluid entering the mating cylindrical surfaces is returned by the indentations as the shaft rotates.

8 Claims, 13 Drawing Sheets

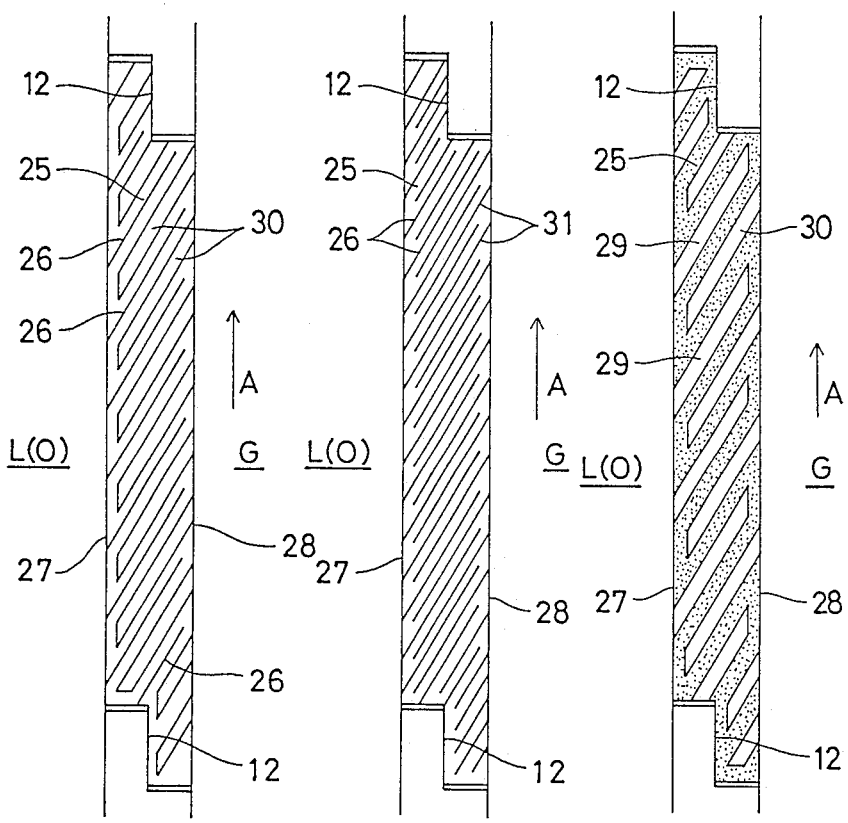

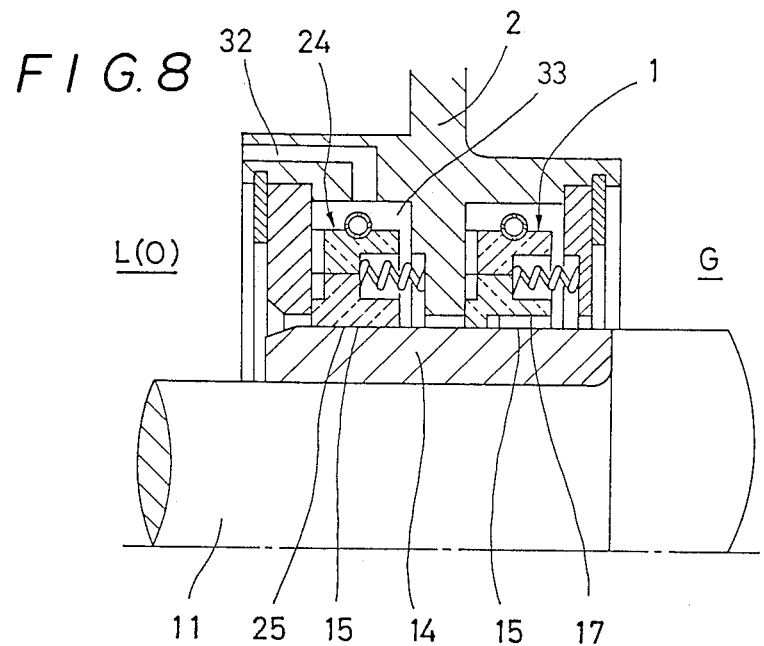
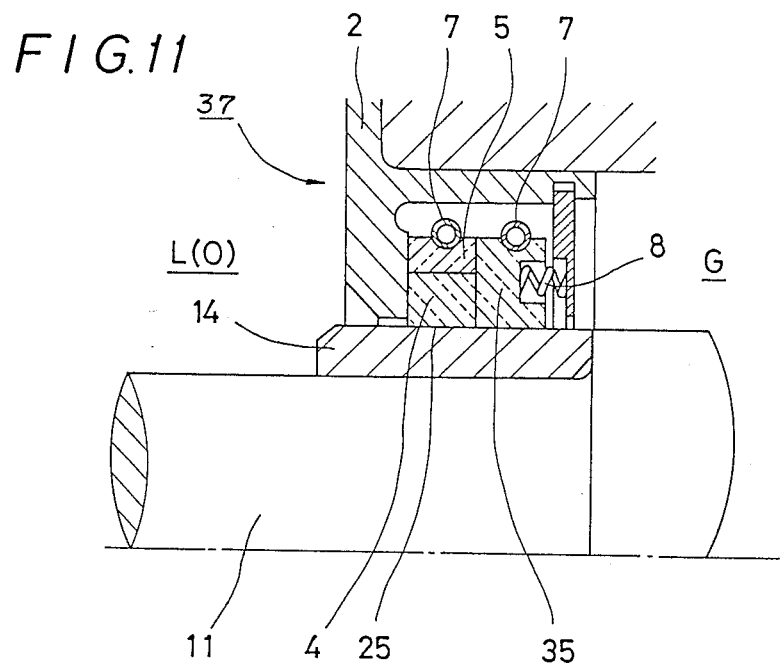

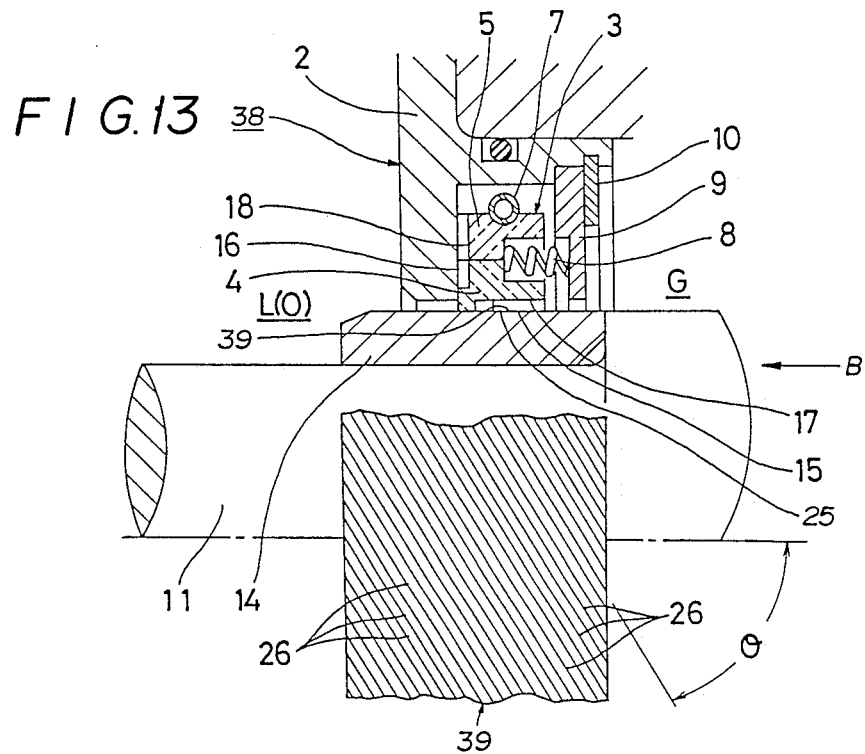
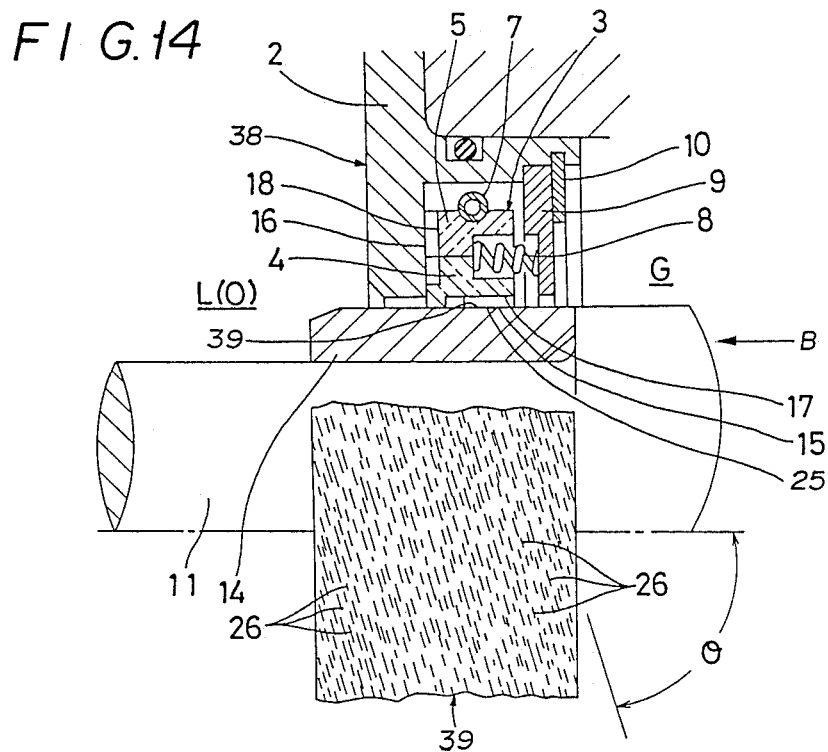

SEALS FOR CYLINDRICAL SURFACES

BACKGROUND OF THE INVENTION

The present invention relates to a seal for a cylindrical surface which is used as a shaft seal devices.

One example of the seal of this kind has been heretofore known as shown in FIGS. 18 to 20, wherein a segment seal 1 is brought into sliding contact with a liner 14 on the side of a shaft 11.

More specifically, this segment seal 1 has a housing 2 which houses therein a seal element (seal ring kit 3) comprising the combination of a seal ring 4, a cover ring 5, a key 6, an extension spring (garter spring 7) and a compression spring (coil spring 8), which is covered with a spring retainer (spring adapter 9) and fixed by a snap ring 10. The seal ring 4 and the cover ring 5 are principally formed of a carbon material, and both the rings 4 and 5 are equally divided into more than two sections depending on the size of a shaft 11, which are combined with the divisional phase deviated in the circumferential direction. A divisional portion of the seal ring 4 is formed into a step joint 12 in order to prevent leakage in an axial direction. The seal element 3 is stopped in rotation through the key 6 by means of a rotation lock pin 13 disposed upright on the housing 2, and held on the shaft 11 by means of the extension spring 7 so as to be able to follow the radial movement of the shaft 11. The internal diameter surface of the seal ring 4 comes into sliding contact with the external diameter surface of a liner 14 slipped over the shaft 11 to constitute a sliding seal portion (a dynamic seal portion 15) which forms a primary seal portion. The seal element 3 is axially biased by the compression spring 8, and the perpendicular end thereof is pressed against the end wall of the housing 2 to constitute a static seal portion 16 which forms a secondary seal portion. The aforesaid internal diameter surface and perpendicular end which form both the seal portions 15 and 16, respectively, are formed with pressure balance grooves 17 and 18 to relieve loads resulting from fluid pressures. FIG. 21 shows one example of the pressure balance groove 17 formed in the internal diameter surface. The liner 14 in sliding contact with the internal diameter surface of the seal ring 4 is generally formed of hardened steel, and the external diameter surface is finished into a flat surface.

The segment seal 1 constructed as described above is used to seal various fluids. However, in the case where a gas G is sealed by this segment seal 1, a sliding seal portion 15 operates under a dry condition, and therefore the resulting from sliding cannot be sometimes removed efficiently. To cope with this situation, in the segment seal 1, the internal diameter surface of the seal ring 4 is formed in advance with the pressure balance groove 17 to positively introduce gas pressure therein to keep the seal surface pressure lower so as to prevent the heat result from sliding from exceeding a level above a limit value. However, when a differential pressure between both sides of the seal exceeds a level above the functional limit of the lowering the surface pressure caused by the pressure balance groove 17 or when the number of revolutions of the shaft increases, sliding heat in excess of the heat limit of the sliding material occurs. Under the condition as described in excess of the heat limit, liquids (cooling liquids) such as oil or water are sprayed by a jet against the shaft portion in the vicinity of the sliding seal portion 15 on the low pressure side to cool the sliding seal portion 15.

Further, in jet engines for aircraft, gas compressors or gas turbines, etc., high pressure gas such as compressed air, combustion gas and the like flow into bearing portions failing to properly lubricate the bearings. Therefore, it becomes necessary to provide a seal with a partition between a bearing chamber and a high pressure gas portion, and the segment seal 1 is used for that partitioning portion. FIG. 22 shows a construction of a bearing chamber 19 and peripheral portions thereof of a jet engine on which the segment seal 1 is mounted for the reason as described above. The segment seals 1 are mounted on both axial sides so as to isolate the bearing chamber 19. Oil for lubrication and cooling of a bearing 20 is supplied by jets 21 and 22 into the bearing chamber 19, the oil also having a function to cool the segment seal 1.

As described above, the segment seal 1 is incorporated into a variety of devices to seal gas, and the segment seal 1 is sometimes used under the situation that in the working atmosphere, the front receives high pressure gas and the back receives low pressure liquid, as described above. Under these circumstances, when the pressure difference between the gas and liquid is small, the liquid enters the sliding seal portion 15 and the liquid sometimes further leaks into the gas side.

The phenomenon wherein when the pressure difference is small, the low pressure liquid leaks into the high pressure gas side is explained as follows:

The case of the aforementioned jet engine is here taken as an example. Oil O in the form of mists for lubrication and cooling of the bearing 20 and cooling of the sliding seal portion 15 is present on the low pressure side of the segment seal 1, and the seal 1 is in an atmosphere wherein the oil O leaks, and the oil O also enters the seal element 3. When the pressure difference between the gas G and the oil O is large, the gas pressure overcomes the surface tension of the oil O and enters a clearance of the seal element 3 to prevent further entry of the oil O, whereas when the pressure difference becomes low, particularly, less than 0.3 kgf/cm$^2$, the surface tension of the oil O becomes greater than the gas pressure so that the oil O enters even the interior of the seal element 3, which has been experimentally understood. Particularly, in the segment seal 1, the leakage of the gas G is concentrated on the divisional portion of the seal element 3 in terms of the divisional construction of the seal element 3, and therefore in the circumferential seal portion (sliding seal portion 15 and static seal portion 16) other than the divisional portion, leakage of the gas G is extremely small, and the oil O is liable to enter that portion. In addition, in the sliding seal portion 15 in sliding contact with the liner 14, oscillations resulting from the rotation of the shaft 11 occur, and therefore, a variation in surface pressure occurs in the sliding seal portion 15 in terms of the following operation with respect to the oscillations of the seal element 3, as a result of which the state of the oil film of the entered oil O tends to change. Furthermore, in the sliding seal portion 15, the seal ring 4 assumes a state wherein the seal ring 4 is levitated from the liner 14 (just like the state wherein a surfboard rides on the waves) due to the oil film formed on the portion 15 to further promote an entry of the oil O and a formation of an oil film. The oil film formed on the sliding portion 15 is scraped at the divisional portion of the seal ring 4 as the shaft 11 rotates and leaks into the gas-G side.

In the prior art, it is considered that in order to effectively operate the segment seal 1 under the condition of low pressure difference as described above, two opposed seal elements 3 are used, as shown in FIG. 23, to feed high pressure gas (air or the like is suitable) into an intermediate chamber 23 to intentionally create the condition of a high pressure difference. However, in this case, a space to some extent is required and the construction is complicated, which is not an adequate measure. Alternatively, if this measure is used on a jet engine, the high pressure gas is bled from the compressor portion of the engine, resulting in a complex engine construction of the engine and the lowering in efficiency caused by bleeding.

SUMMARY OF THE INVENTION

In view of the foregoing, it is an object of the present invention to provide a construction which is designed so that even when a pressure difference between gas and liquid is small and when no pressure difference is present, the entry of liquid into the gas side can be minimized, and which can be widely applied not only to segment seals but also to seals for cylindrical surfaces.

For achieving the aforesaid object, the present invention provides a seal characterized in that an internal diameter seal surface of the seal member on the fixed side in direct contact with the seal member on the rotational side or an external diameter seal surface of the seal member on the rotational side in direct contact with the seal member on the fixed side is formed with a number of inclined grooves or stripes. In the segment seal, the seal member on the fixed side comprises seal rings which are divided into plural sections in the circumferential direction, and the seal member on the rotational side comprises a liner on the shaft side in terms of the relationship between the segment seal and the liner.

In the seal according to the present invention, liquids entering the sliding seal portion formed between the seal member on the rotational side and the seal member on the fixed side can be discharged toward the liquid side by the viscosity of such liquids and by the pumping action of a number of grooves or stripes formed in the seal member on the fixed side or on the rotational side, to prevent such liquids from leakage.

While the outline of the present invention has been described simply, other objects and new features of the present invention will be completely apparent from reading the ensuing detailed description in conjunction with the embodiments shown in the accompanying drawing. It is to be noted however that the drawings merely show one embodiment for describing the present invention and the technical scope of the present invention is not limited thereby.

BRIEF DESCRIPTION OF THE DRAWINGS

FIGS. 1, 4, 8 and 11 are sectional views, respectively, showing the state wherein a segment seal according to the present invention is mounted;

FIGS. 2, 3, 5, 6, 7, 9 and 10 are developed views, respectively, showing essential parts of an internal diameter surface of a seal ring according to the present invention;

FIGS. 13 to 17 are sectional views, respectively, showing the state wherein a seal according to the present invention is mounted and developed views, respectively, showing essential parts of an external diameter surface of a liner;

DESCRIPTION OF THE PREFERED EMBODIMENTS

Embodiments of the present invention will be described hereinafter with reference to the accompanying drawings.

Figure 1:
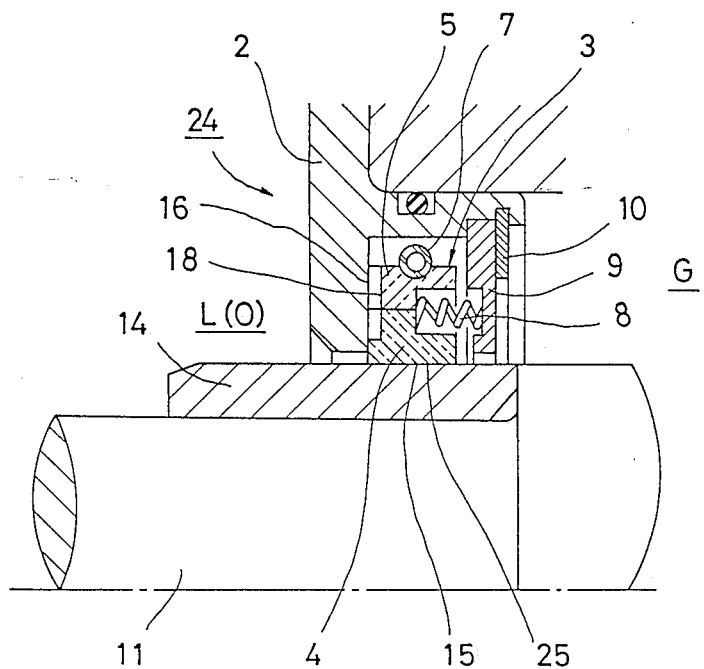
Figure 2:
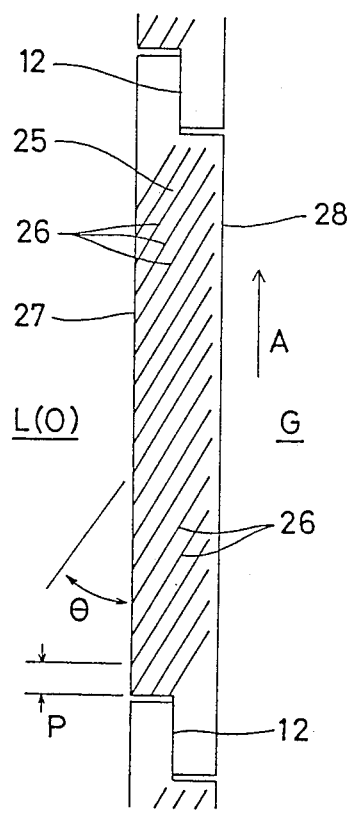
Figure 19:
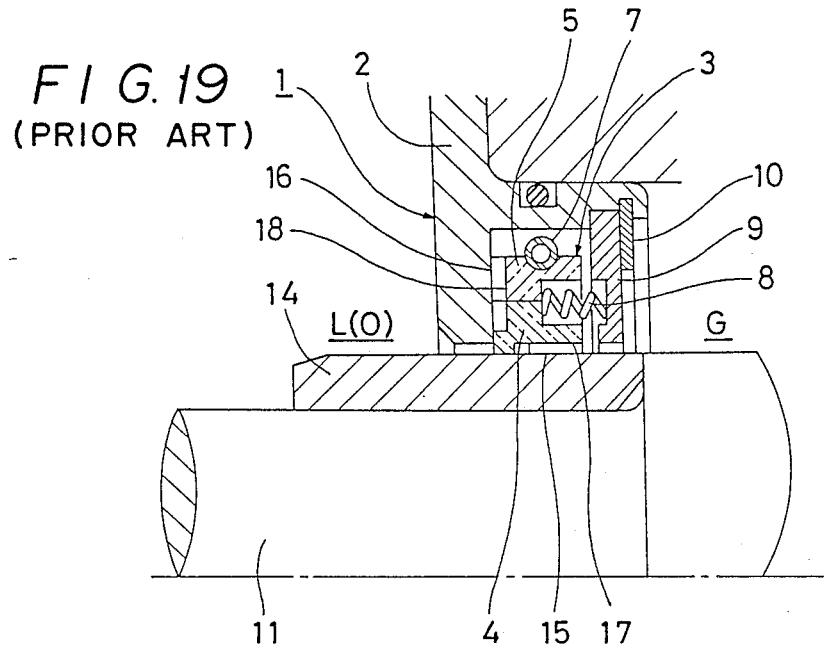
FIGS. 19, 20, 22, 23 and 24 are sectional views, respectively, showing the state wherein a seal according to prior art is mounted.
Figure 20:
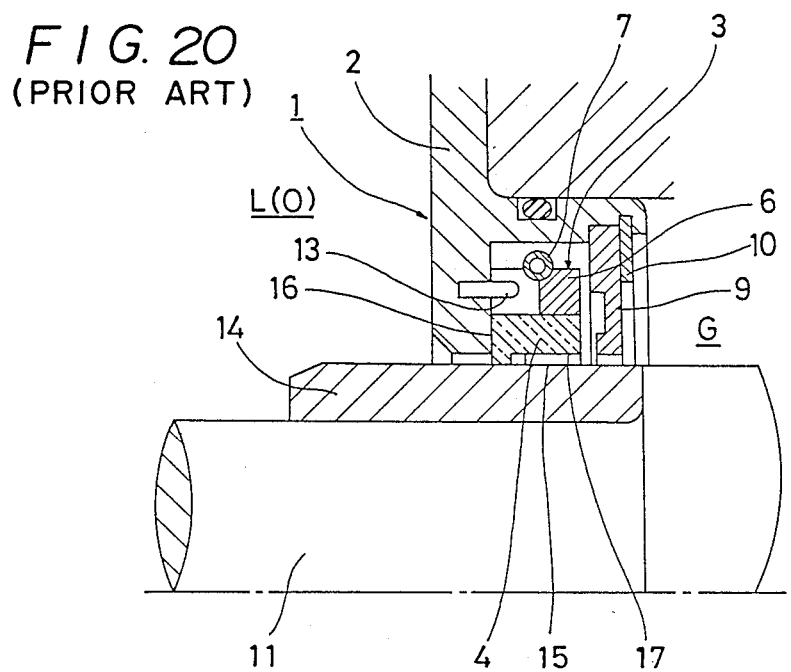
Figure 22:
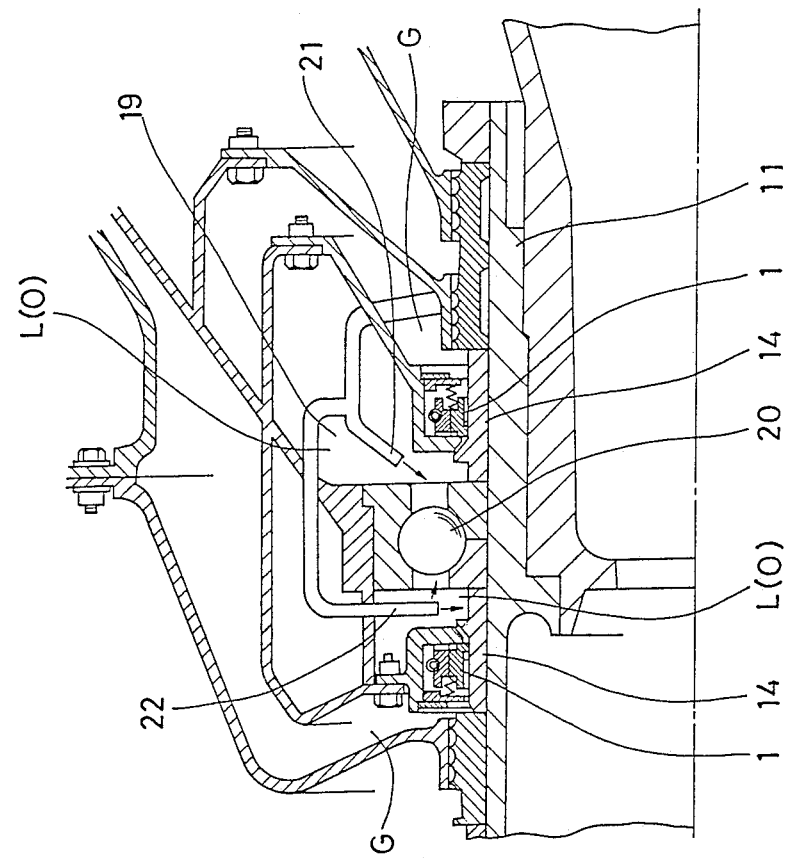

FIG. 1 depicts a section showing the state wherein a segment seal 24 corresponding to that shown in FIG. 19 of the prior art is mounted. As will be apparent from a comparison between these Figures, in the segment seal 24 according to this embodiment, a pressure balance groove 17 is not formed in an internal diameter seal surface 25 of a seal ring 4 constituting a seal element 3 but the entire surface of the internal diameter seal surface 25 is placed in close contact with the liner 14 to form a sliding seal portion 15, which is formed with a number of elongated indentations 26 as shown in FIG. 2. That is, the segment seal 24 is mounted so as to partition a high pressure gas G from a low pressure liquid L and is constructed on the assumption that it is used under the condition that a pressure difference between the gas G and the liquid L is small. In the case where the pressure difference is small as described and more specifically the pressure difference is less than 0.3 kgf/cm$^2$, the internal diameter of the seal ring 4 can be sufficiently applied as a flat type which has no pressure balance groove 17. Conversely, when the pressure balance groove 17 is present, the liquid L entered the sliding seal portion 15 is scraped by a dam portion of the pressure balance groove 17 to further promote the entry of the liquid L. In addition, in the arrangement wherein the pressure balance groove 17 is eliminated to provide a simple flat surface, the seal ring 4 is levitated as in the phenomenon in which a surfboard rides on the wave, failing to prevent the entry of the liquid L. In view of the foregoing, the segment seal 24 is designed so that an internal diameter surface 25 formed into a flat configuration is formed with the indentations 26 so as to return the liquid L entered the sliding seal portion 15 by making use of the rotational peripheral speed of the shaft 11.

Figure 3:
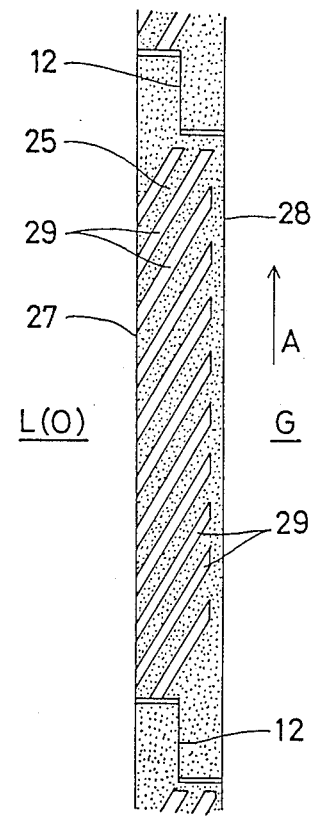

FIG. 2 shows the internal diameter seal surface 25 in a developed form, in which the high pressure gas G and the low pressure liquid L are positioned on the right-hand and left-hand, respectively, as viewed in the Figure. The rotational direction relative to the liner 14 as the shaft 11 rotates is indicated by arrow A in the Figure. The indentations 26 are formed so as to reach the edge 27 on the liquid side of the internal diameter seal surface 25 but not to reach the edge 28 on the gas side, and the indentations 26 are formed while being inclined at an angle of $0° < \theta < 90°$ in the rotational direction A starting at a portion formed at the edge 27 on the liquid side. FIG. 3 shows an example in which the indentations 26 are widened to form grooves 29. It is noted that in FIGS. 2 and 3, the indentations 26 or grooves 29 are not provided in step joints 12.

Figure 4:
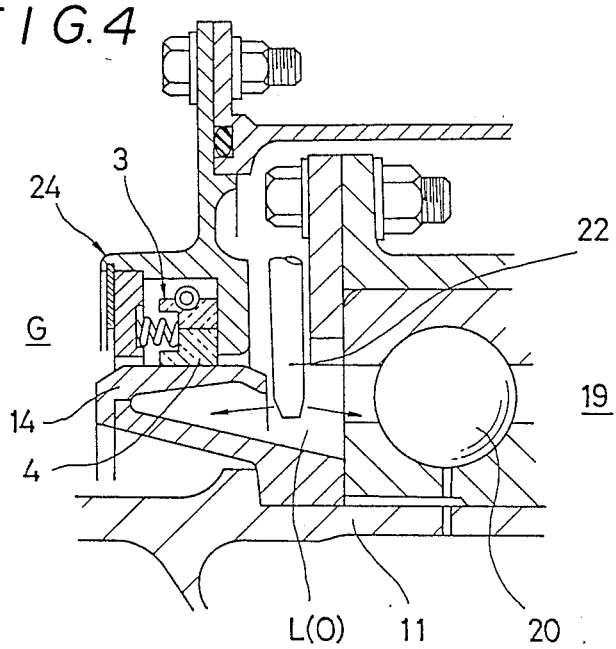
Figure 23:
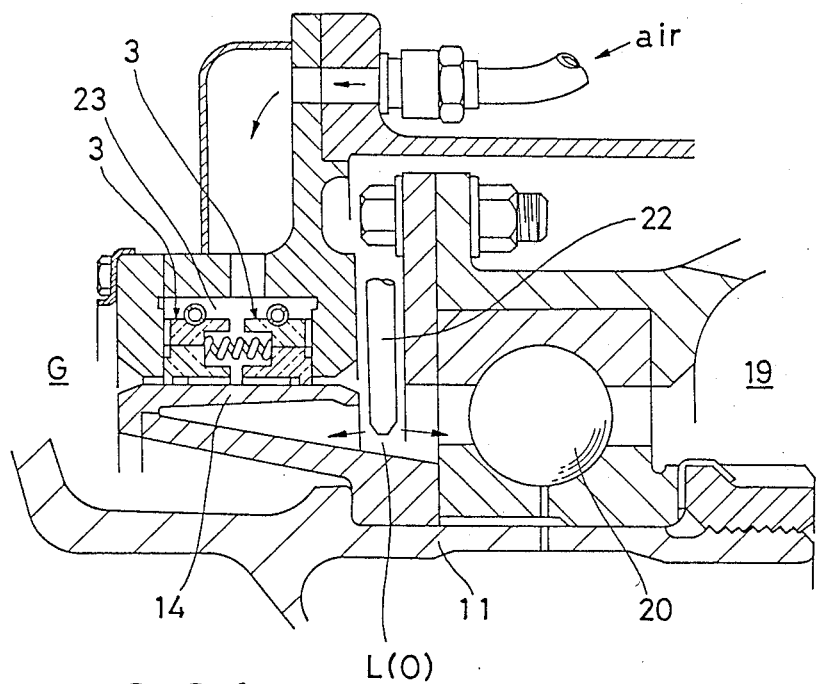

The arrangement wherein the segment seal 24 is mounted on the bearing 20 portion of a jet engine shown in FIG. 23 is as shown in FIG. 4. As will be apparent from a comparison between both the Figures, according to the segment seal 24, the construction can be simplified and the occupying space can be considerably reduced. A mounting position of a fan (not shown) arranged on the left side as viewed in the Figure can be made closer to the bearing 20. The device can be lightweight as a whole, and at the same time, bleeding from the compressor portion is not required thus enhancing the efficiency of the engine.

FIGS. 5 to 7 show a type which can be utilized when the pressure difference between the gas G and the liquid L is larger to some extent as compared with the situation in the case of the above-described two examples (FIGS. 2 and 3). In FIGS. 5 to 7 both the indentations 26 in FIGS. 5 and 6 and the grooves 29 in FIG. 7 for discharging the liquid are provided and the grooves 30 in FIGS. 5 and 7 and indentations 31 in FIG. 6 are provided for the pressure balance.

Figure 9:
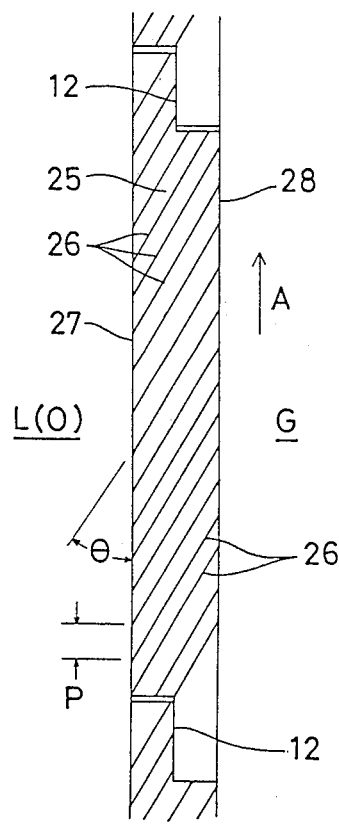
Figure 10:
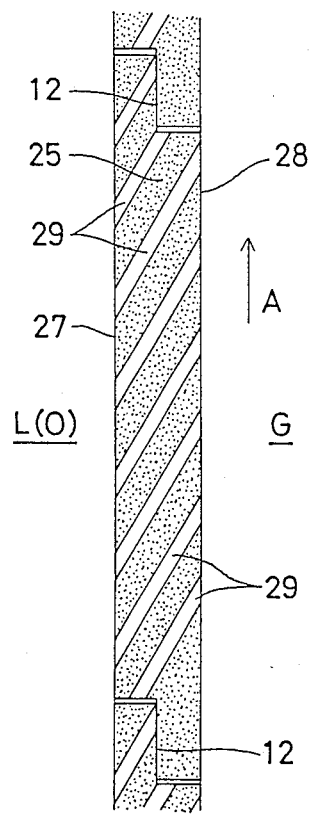

It is contemplated that in the case where the pressure difference between the gas G and the liquid L is further large, the segment seal 24 according to the present invention with the indentations 26 or grooves 29 for discharging the liquid and the segment seal 1 of the conventional type are arranged. This construction is particularly effective where during the operation, the liquid L causes the seal portion 15 to be wetted and during the stoppage or at the time of start, the liquid L enters the seal portion 15. That is, in the case where the pressure difference is large during high speed rotation, the sliding heat of the seal portion 15 increases accordingly. Therefore, when the seal portion 15 is wetted by the liquid L, the liquid L, particularly the oil O, becomes thermally decomposed due to the heat generation during the high speed operation to produce sludge, and the oil O is carbonized or caulked to materially deteriorate the operability of the seal or to lose the sealing function as the case may be. On the other hand, in the FIG. 8 construction, the segment seal 24 of the present invention is arranged on the liquid L side, and the segment seal 1 of the conventional type on the gas G side is operated under a dry condition, thus eliminating a liquid leakage of the seal 1. In the segment seal 24 of the present invention having the aforesaid construction, the indentations 26 or grooves 29 are formed to extend through the axial length as shown in FIGS. 9 and 10. In FIG. 8, reference numeral 32 designates a vent hole bored in a chamber 33 between both the segment seals 1 and 24. More specifically, the vent hole 32 is provided to vent the gas G leaked from the segment seal 1 on the high pressure side, and machined in a direction at which the liquid L is difficult to flow in. Any number of such vent holes 32 can be provided in the circumferential direction, and particularly the vent hole 32 provided at the lower side of the chamber 33 can also function as a drain hole for the liquid L.

Figure 24:
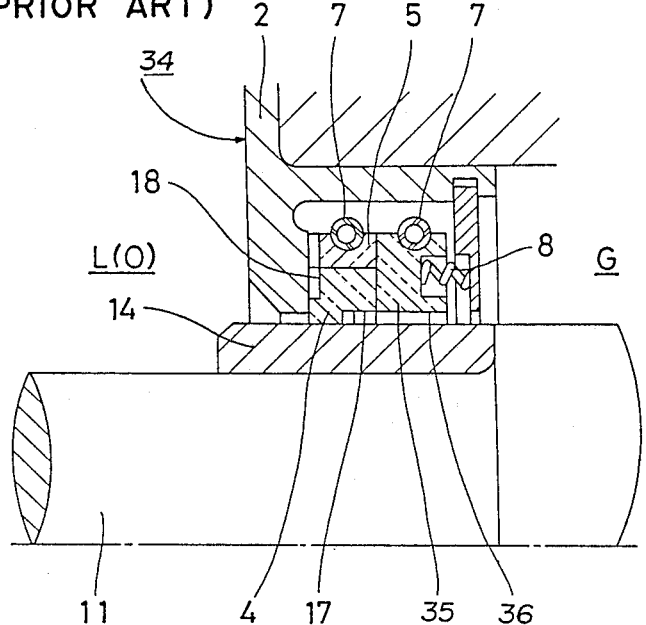

The above-described construction can be applied not only to the segment seal of the 2-ring type so far described but to a segment seal of the 1-ring type without the cover ring 5 and to a segment seal of the 3-ring type also serving as a back ring. FIG. 24 shows one example of a segment seal 34 of the 3-ring type according to the prior art, in which the seal ring 4 and the back ring 35 are formed in their internal diameter surfaces with pressure balance grooves 17 and 36. On the other hand, a segment seal 37 of the same type as that previously mentioned according to the present invention is not provided with pressure balance grooves but has an internal diameter surface 25 of the seal ring 4 formed with the indentations 28 or grooves 29 for discharging the liquid so far described, as shown in FIG. 11.

Figure 12:
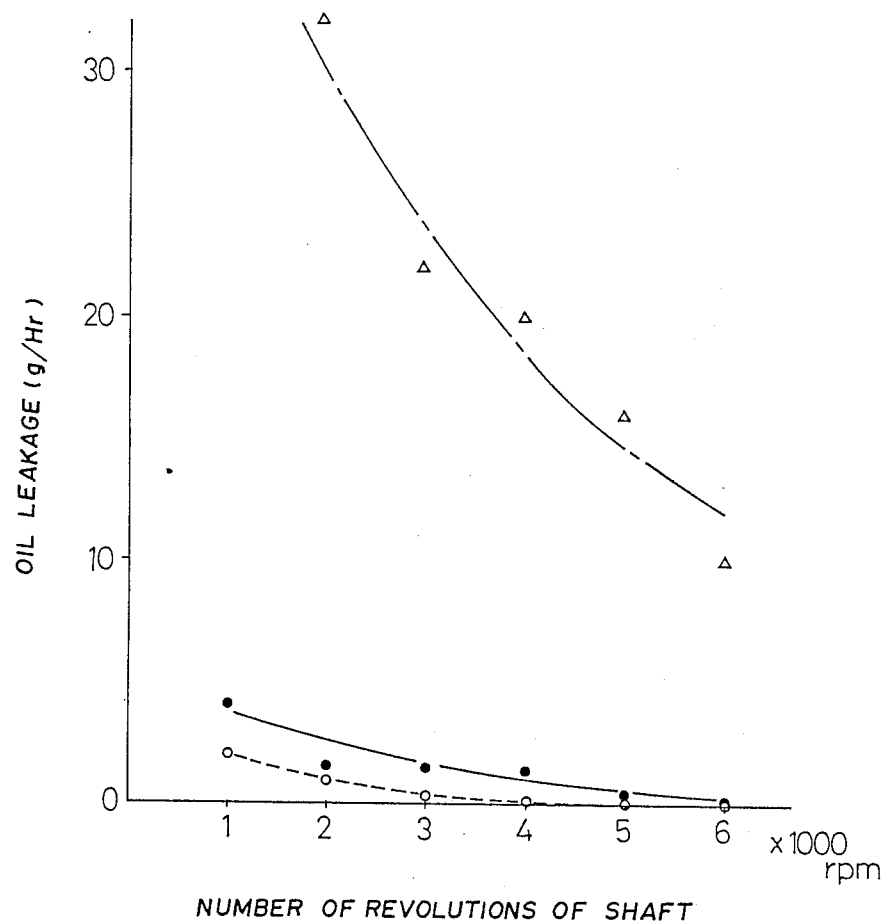
FIG. 12 is a graph showing the results of performance experiments.

FIG. 12 is a graph showing the results of performance experiments conducted on the segment seal 24 according to the present invention in which the indentations 26 shown in FIGS. 2 and 9 are formed in the internal diameter seal surface 25 of the seal ring 4. The experiments was carried out in the following procedure:

| | |
|---|---|
| Size of seal: | Φ250 mm |
| Oil: | Lubricating oil for aircraft (60° C.) |
| Roundness of liner: | 0.015 mm (elliptical shape) |
| Pressure difference: | none |
| Temperature: | Normal temperature |
| Width of indentations: | 0.2 mm |
| Depth of indentations: | 0.1 mm |
| Inclined angle of indentations (θ) | 15° |
| Pitch of indentations: | 6 mm |
| ● Plot: | FIG. 2 type |
| ○ Plot: | FIG. 9 type |
| ΔPlot: | Flat face type |

COMPARATIVE EXAMPLE

The results showed that the segment seal 24 according to the present invention remarkably reduced oil leakage as compared with the seal of the flat face type as a comparative example. This experiment was conducted under the condition close to the peripheral speed of the rotational shaft of the front fan of an aircraft engine and under the condition close to practical use since the pressure of the fan portion rarely occurs. As the result of the experiments, the effect for the liner 14 slightly modified was also confirmed. Furthermore, it has been confirmed as the result of other experiments that the depth of the indentations 26 or grooves 29 is preferably less than approximately 0.5 mm (approximately 0.02 inch).

An example in which the characteristic construction of the present invention is applied to a rotational member will be described hereinafter.

FIG. 13 depicts the mounting state of a segment seal 38 corresponding to FIG. 19 according to the above-described prior art. An external diameter surface 39 of the liner 14 in sliding contact with an internal diameter surface 25 of the seal ring 4 of the segment seal 38 is formed with a number of indentations 26. The indentations 26 can be processed when the external diameter surface 39 of the liner 14 is surface-finished. In case of turning-finish, the indentations 26 are of a single continuous form as shown in FIG. 13, and in case of grinding-finish, they are of a discontinuous form as shown in FIG. 14. The indentations 26 can be replaced by grooves 29 having greater widths but if the grooves 29 are employed as shown in FIG. 15, the depth thereof need be smaller than that of the indentations 26.

Figure 15:
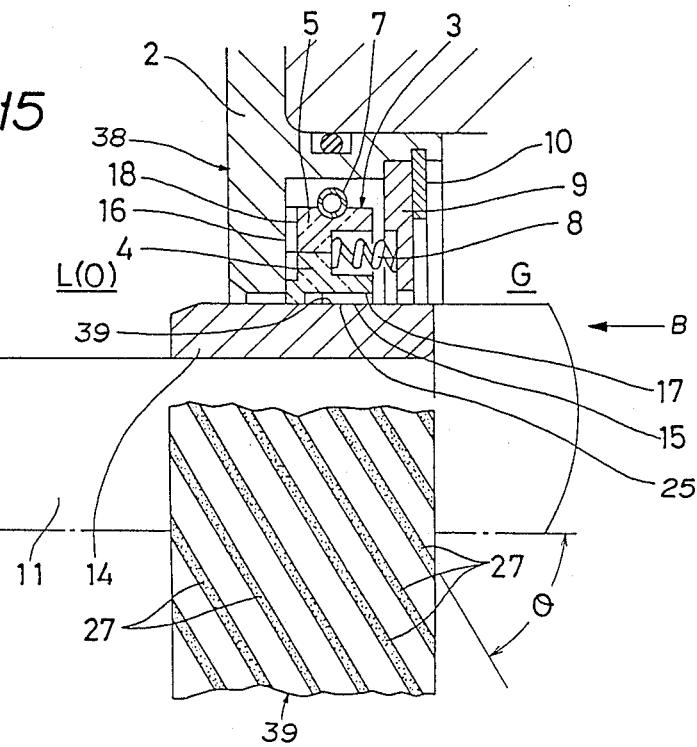

In these FIGS. 13 to 15, the shaft 11 and the liner 14 slipped thereover are to be rotated counterclockwise as viewed in the direction of B, and the indentations 26 or grooves 29 are inclined in the direction as shown so as to push back the liquid L by the pumping action thereof, the angle θ inclined with respect to the axis thereof being set to 30° < θ < 90°, and the depth being set to 0.25 mm (0.01 inch) or less.

Figure 16:
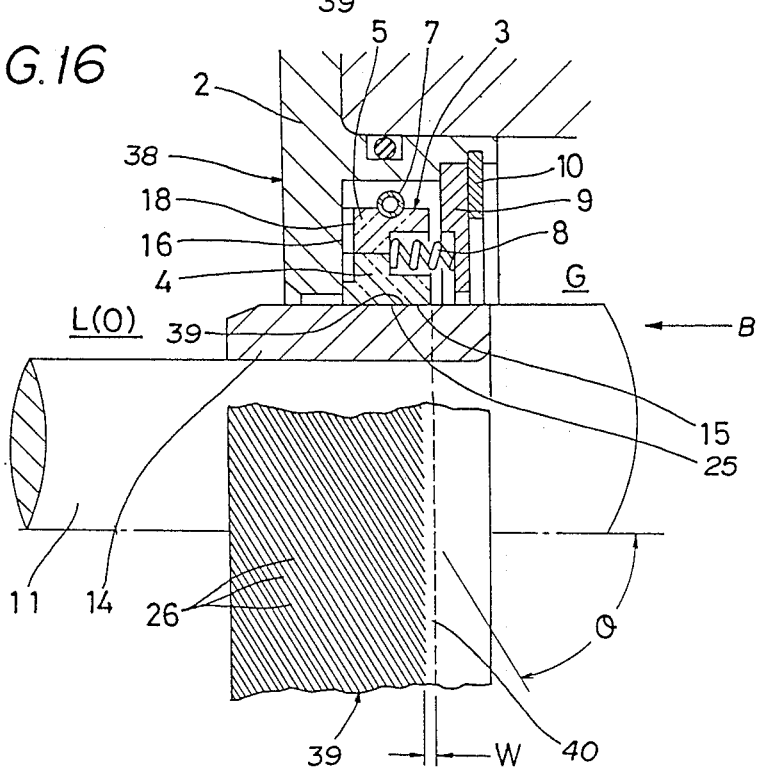

In FIGS. 13 to 15, the indentations 26 or grooves 29 are formed in the entire external diameter surface of the liner 14. That is, they are formed to extend through the axial length of the sliding seal portion 15 but the indentations 26 or grooves 29 are very finely formed and therefore, leaking of the gas G toward the liquid L through the indentations 26 or grooves 29 can be ignored in a sense of quantity. To stop the leakage of the gas G, a non-processed zone 40 of the indentations 26 or grooves 29 may be provided in the edge on the gas side of the sliding seal portion 15 as shown in FIG. 16. Preferably, the width W of the non-processed zone 28 is more than 0.5 mm.

Figure 17:
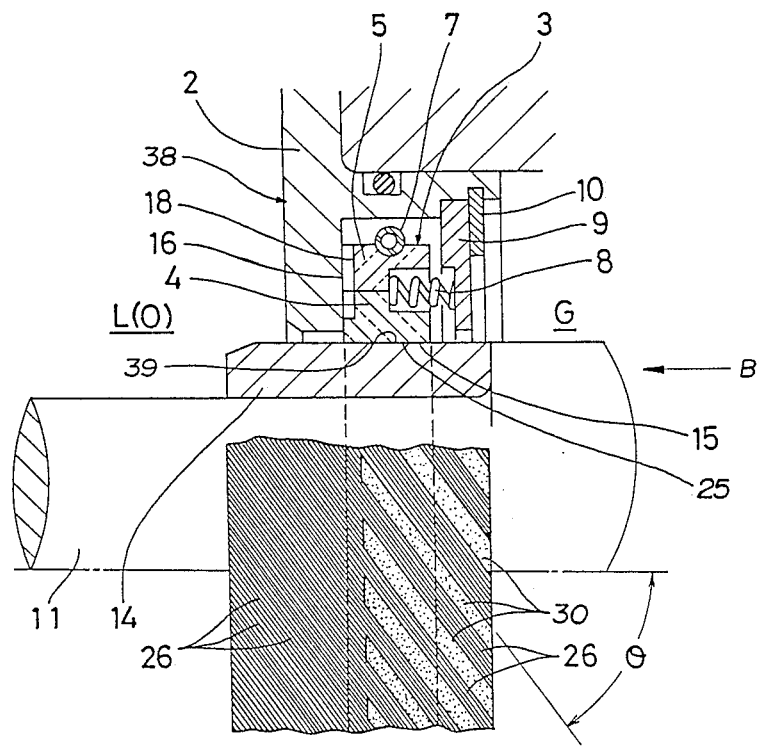
Figure 18:
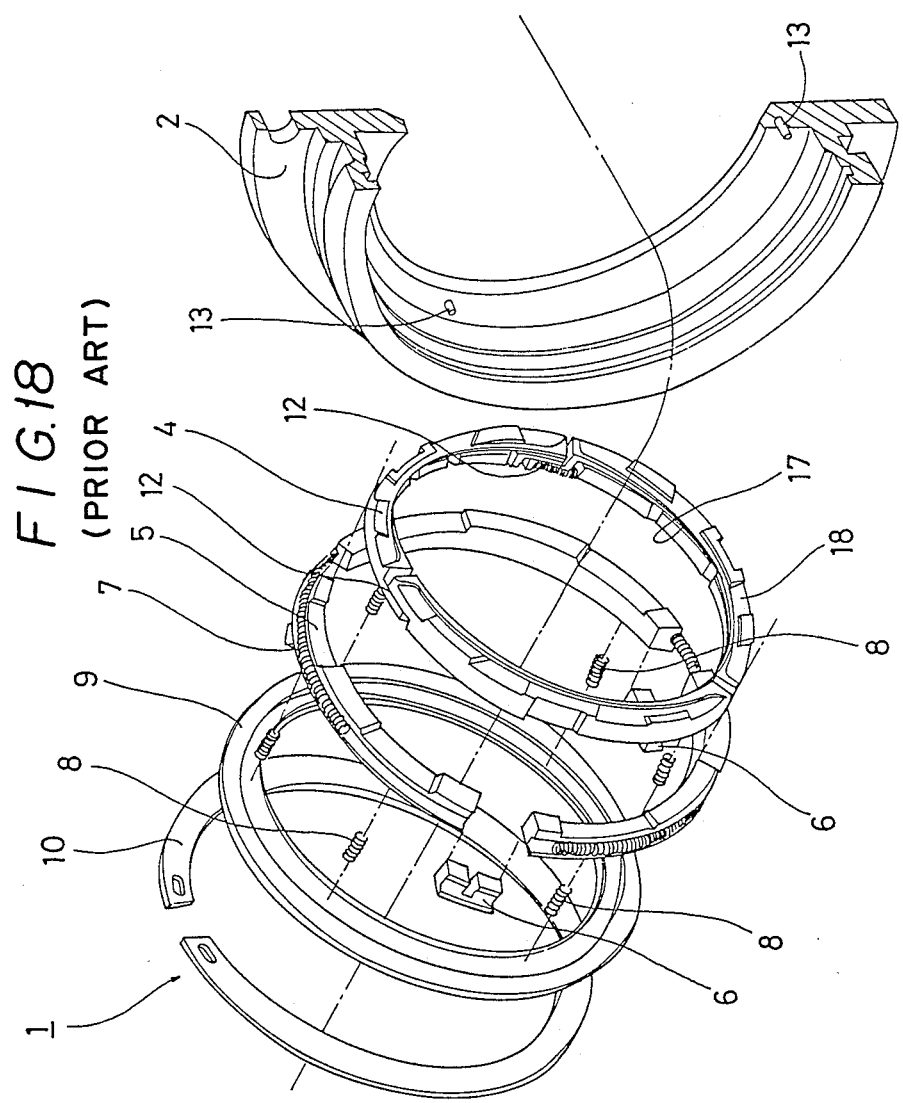
FIG. 18 is a partly cutaway exploded perspective view of a segment seal according to prior art.
Figure 21:
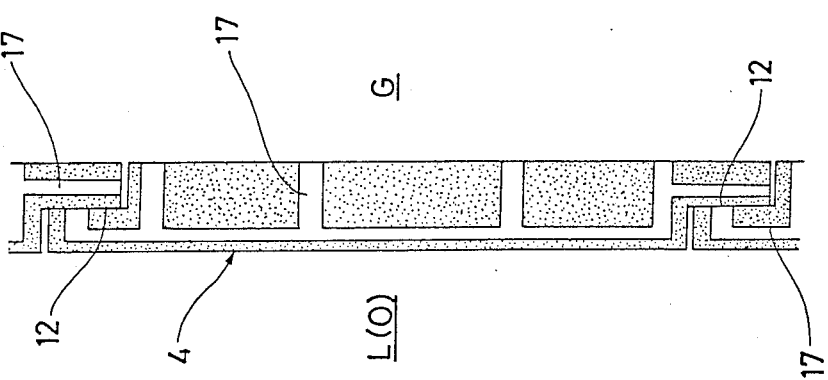
FIG. 21 is a developed view showing essential parts of an internal diameter surface of a seal ring according to prior art.

In FIGS. 13 to 15, the internal diameter surface 25 of the seal ring 4 in sliding contact with the external diameter surface 39 of the liner 14 formed with the indentations 26 or grooves 29 is formed with pressure balance grooves 17 as illustrated in FIG. 21. Accordingly, the external diameter surface 39 of the liner 14 merely comes into sliding contact with the seal dam portion other than those formed with the pressure balance grooves 17 out of the internal diameter surface 25 of the seal ring 4, but even with such a construction, the indentations 26 or grooves 29 can sufficiently perform their function. However, as shown in FIG. 16, the internal diameter surface 25 of the seal ring 4 is not formed with the pressure balance grooves 17 but the internal diameter surface 25 is formed into a flat configuration and brought with overall contact with the external diameter surface 39 of the liner 14, which will no doubt enhance the function of the indentations 26 or grooves 29. Therefore, preferably, the internal diameter surface 25 of the seal ring 4 is formed with the pressure balance grooves 17 if necessary. As shown in FIG. 17, it is considered that the internal diameter surface 25 of the seal ring 4 is formed into a flat configuration and the indentations 26 or grooves 29 are adjusted to the external diameter surface 39 of the liner 14 to form the pressure balance grooves 30.

When the present seal is mounted on the bearing portion 20 of a jet engine shown in FIG. 23, the state thereof assumes to the state similar to that previously shown in FIG. 4. As will be apparent from a comparison between both the Figures, according to the present seal, the construction can be simplified and the occupying space can be considerably reduced. The mounting position of a fan (not shown) arranged on the left side as viewed in the Figure can be made closer to the bearing 20. The device can be light-weight as a whole and at the same time, bleeding from the compressor portion is not required thus enhancing the efficiency of the engine.

In the case where the device of the present invention is used for machinery in which the pressure of the gas G increases with the result that the pressure difference between the gas G and the liquid L further increases, it is considered that the seal construction of the present invention comprising a combination of the liner 14 with the external diameter surface 39 formed with the liquid discharging indentations 26 or grooves 29 and the seal ring 4 with the internal diameter surface 25 formed into a flat configuration and the conventional type segment seal construction may be arranged. This construction is particularly effective in the case where during the operation, the liquid L causes the seal portion 15 to be wetted, and during the stoppage or at the time of start, the liquid L enters the seal portion 15. Namely, for example, in the compressor, where the pressure of the liquid L during high speed operation is high, the sliding heat of the seal portion 15 increases accordingly. Therefore, when the seal portion 15 is in the state wetted by the liquid L, particularly the oil O becomes heat decomposed to produce sludge, and the oil O is carbonized or caulked to materially lower the operability of the seal and lose the sealing function as the case may be. On the other hand, in the present construction, the seal construction of the present invention is arranged on the liquid L side and the conventional type segment seal construction is operated under the dry condition. With this, a liquid leak can be eliminated in the seal.

The above-described construction can be applied, other than a 2-ring type segment seal so far described, to the 1-ring type segment seal without the cover ring 5, and a 3-ring type segment seal provided with a back ring.

Furthermore, generally, formation of the external diameter surface 39 of the liner 14 made of hardened steel with the indentations 26 or grooves 27 is extremely easily processed as compared with the case of formation of the internal diameter surface 25 of the seal ring 4 made of carbon with the indentations or grooves. In addition, particularly in the processing of indentations and finish-processed portions, it is possible to obtain high precision easily by the machining feed (similar to the feed of machining threads) during the machining of parts, which results in extremely high utility for practical use.

While a description has been made of the preferred embodiments of the present invention, it is to be noted that various modification can be made in the present invention without departing form the principle thereof. It is therefore desired that all the modifications by which the advantageous effects of the present invention are substantially obtained through the use of the structure substantially identical or corresponding thereto be included in the scope of the present invention.

What is claimed is:

1. A shaft seal for sealing fluids comprising a rotating shaft means having an axis and an external cylindrical surface, a seal ring disposed about said shaft means, said seal ring having an internal cylindrical surface juxtaposed to said external cylindrical surface and mating therewith to form mating cylindrical surfaces, one of said cylindrical surfaces being a smooth cylindrical surface, a plurality of spaced, generally parallel indentations formed in said smooth cylindrical surface, said indentations extending at an acute angle relative to the axial direction of said shaft means such that fluid entering said mating cylindrical surfaces is returned by said indentations as said shaft means rotates, said one cylindrical surface having two spaced longitudinal ends, said indentations extending to one of said longitudinal ends of said one cylindrical surface, a plurality of spaced and generally parallel grooves in said one cylindrical surface, said grooves being wider than said indentations, said grooves being generally parallel to said indentations and being disposed in alternating relationship with said indentations.

2. A shaft seal according to claim 1, wherein said grooves terminate short of said one longitudinal end of said one cylindrical surface and extend to the other longitudinal end of said one cylindrical surface.

3. A shaft seal for sealing fluids comprising a rotating shaft means having an axis and an external cylindrical surface, a seal ring disposed about said shaft means, said seal ring having an internal cylindrical surface juxtaposed to said external cylindrical surface and mating therewith to form mating cylindrical surfaces, one of said cylindrical surfaces being a smooth cylindrical surface, a plurality of spaced, generally parallel indentations formed in said smooth cylindrical surface, said indentations extending at an acute angle relative to the axial direction of said shaft means such that fluid entering said mating cylindrical surfaces is returned by said indentations as said shaft means rotates, said one cylindrical surface having two spaced longitudinal ends, said indentations extending to one of said longitudinal ends of said one cylindrical surface, said indentations being designated first indentations, further comprising a plurality of spaced, generally parallel second indentations being parallel to said first indentations and being disposed in alternating relationship relative to said first indentations, said second indentations terminating short of said one longitudinal end of said one cylindrical surface and extending to the other longitudinal end of said one cylindrical surface.

4. A shaft seal according to claim 3, wherein said first indentations and said second indentations have the same width.

5. A shaft seal according to claim 3, wherein said first indentations and said second indentations have different widths.

6. A shaft seal according to claim 3, wherein the depth of said first indentations is different from the depth of said second indentations.

7. A shaft seal for sealing fluids comprising a rotating shaft means having an axis and an external cylindrical surface, a seal ring disposed about said shaft means, said seal ring having an internal cylindrical surface juxtaposed to said external cylindrical surface and mating therewith to form mating cylindrical surfaces, one of said cylindrical surfaces being a smooth cylindrical surface, a plurality of spaced, generally parallel indentations formed in said smooth cylindrical surface, said indentations extending at an acute angle relative to the axial direction of said shaft means such that fluid entering said mating cylindrical surfaces is returned by said indentations as said shaft means rotates, said shaft means comprising a shaft and a liner disposed about said shaft, said indentations being formed on the outer cylindrical surface of said liner, said liner having a greater axial length than the axial length of said mating cylindrical surfaces, said indentations extending to a portion of said liner which extends beyond the longitudinal ends of said mating cylindrical surfaces.

8. A shaft seal for sealing fluids comprising a rotating shaft means having an axis and an external cylindrical surface, a seal ring disposed about said shaft means, said seal ring having an internal cylindrical surface juxtaposed to said external cylindrical surface and mating therewith to form mating cylindrical surfaces, one of said cylindrical surfaces being a smooth cylindrical surface, a plurality of spaced, generally parallel indentations formed in said smooth cylindrical surface, said indentations extending at an acute angle relative to the axial direction of said shaft means such that fluid entering said mating cylindrical surfaces is returned by said indentations as said shaft means rotates, said one cylindrical surface having two spaced longitudinal ends, said indentations extending to one of said longitudinal ends of said one cylindrical surface, some of said indentations extending between both longitudinal ends of said one cylindrical surface, and other of said indentations having terminating ends terminating short of said other longitudinal end of said one cylindrical surface, and further comprising grooves extending between said terminating ends of said other indentations and said other longitudinal ends of said one cylindrical surface, said grooves being wider than said indentations.

* * * * *